(12) United States Patent
Kazemizadeh

(10) Patent No.: US 7,544,763 B2
(45) Date of Patent: Jun. 9, 2009

(54) CATALYST-FREE PROCESS FOR THE MANUFACTURE OF A FATTY ACID ESTER OIL POLYOL

(75) Inventor: Mohammad Kazemizadeh, Blooming Prairie, MN (US)

(73) Assignee: Arkema Inc., Philadelphia, PA (US)

( * ) Notice: Subject to any disclaimer, the term of this patent is extended or adjusted under 35 U.S.C. 154(b) by 159 days.

(21) Appl. No.: 11/593,923

(22) Filed: Nov. 7, 2006

(65) Prior Publication Data

US 2008/0108782 A1    May 8, 2008

(51) Int. Cl.
*C08G 63/48* (2006.01)
*C08G 83/00* (2006.01)

(52) U.S. Cl. .................. 528/295.5; 528/1; 549/513; 549/525; 549/530; 554/24; 554/30; 554/149; 554/168; 554/174

(58) Field of Classification Search .................. None
See application file for complete search history.

(56) References Cited

U.S. PATENT DOCUMENTS

| | | | |
|---|---|---|---|
| 5,302,626 A | | 4/1994 | Hoefer et al. |
| 5,324,846 A | * | 6/1994 | Hirshman et al. ........... 554/121 |
| 6,107,433 A | | 8/2000 | Petrovic et al. |
| 6,433,121 B1 | * | 8/2002 | Petrovic et al. ................ 528/1 |
| 6,891,053 B2 | | 5/2005 | Chaser et al. |

* cited by examiner

*Primary Examiner*—Vasu Jagannathan
*Assistant Examiner*—Gennadiy Mesh
(74) *Attorney, Agent, or Firm*—Thomas F. Roland

(57) ABSTRACT

The present invention relates to a manufacturing process for producing a polyol from a fatty acid ester in-situ. The process does not use any added organic or inorganic acid catalyst. The polyol produced by the process is essentially free of any cation or anion. The fatty acid ester oil epoxidation and hydroxylation reactions can occur progressively in the same reactor for essentially a one-pot reaction. The polyol produced by the process is essentially free of any cation or anion. The polyol can be used to produce polyurethanes having improved properties.

9 Claims, No Drawings

CATALYST-FREE PROCESS FOR THE MANUFACTURE OF A FATTY ACID ESTER OIL POLYOL

FIELD OF THE INVENTION

The present invention relates to a manufacturing process for producing a polyol from a fatty acid ester in-situ. The process does not use any added organic or inorganic acid catalyst. The polyol produced by the process is essentially free of any cation or anion.

BACKGROUND OF THE INVENTION

There has been an increased interest in the use of renewable oleochemical oil polyols as a substitute for petroleum-based polyols, especially for use in the production of polyurethanes. There have been several processes suggested for converting an epoxidized vegetable oil into a polyol. Each of the processes in the art converts the epoxide to the polyol by using an acid catalyst such as fluoroboric, or sulfuric acid, or acid treated clay to open the oxirane ring and then add an alcohol. Examples of fatty polyols made by acid catalyzed hydroxylation of epoxidized fatty acids include U.S.Pat. Nos. 4,508,853; 4,546,120; 4,551,517; 4,742,087; 4,826,944; 4,886,893; 5,266,714; and 5,302,626.

U.S. Pat. No. 6,107,433 discloses a process for converting vegetable oil epoxide into polyols by using a fluoroboric acid as a catalyst plus an alcohol or an alcohol and water. The problem with this process is that the fluoroboric acid is expensive, highly reactive and corrosive to the equipment, hazardous to handle, and highly exothermic, must be quenched, and its by-products present disposal problems.

U.S. Pat. No. 6,891,053 describes the use of acid treated clay to convert epoxide oil to polyol. This process has a solid waste disposal and final products must be filtered to remove the clay catalyst which is a production problem.

Unfortunately, fatty acid ester polyols formed by these current processes contain cation and anion residues. The cation and anion residues in a polyol can effect the performance of a polyurethane coating made with the polyols. For instance, the ion content can negatively change the nitrogen release characteristics of fertilizers. A polyurethane coating made from polyol containing ions may also disintegrate faster than polyurethane without ions. It is desired to have a process for producing a vegetable oil polyol in which the product is free of cation and anion residuals.

Surprisingly it has been found that the addition of a catalyst is not necessary to the formation of a fatty acid ester polyol when an in-situ epoxidized oil is used prior to a typical drying and filtering step.

SUMMARY OF THE INVENTION

The invention relates to a method for making an fatty acid ester oil-based polyol comprising the step of admixing an epoxidized fatty acid ester oil with one or more alcohols, water, or a mixture thereof, to form by hydroxylation an oil-based polyol, wherein no acid catalyst is added to the reaction mixture.

The invention also relates to the fatty acid ester-based polyol formed by the process, and polyurethanes formed therefrom.

DETAILED DESCRIPTION OF THE INVENTION

The invention relates to a process for manufacturing a fatty acid ester polyol that does not use added organic or inorganic acid catalyst, and thus producing a polyol essentially free of any cation or anion.

The process of the invention involves the following steps:
 a) a fatty acid ester oil is epoxidized to the desired level
 b) said epoxidized oil is separated from the aqueous phase
 c) said separated epoxidized oil is then washed with water to remove residual hydrogen peroxide and peracid
 d) optionally the epoxidized oil is dried or partially dried under vacuum
 e) one or more alcohols are added to the epoxidized oil reactor, without adding a catalyst
 f) the alcohol/epoxidized oil is heated to reflux, forming a polyol.

Examples of fatty acid ester oils that may be used in the process include, but are not limited to, soybean oil, safflower oil, linseed oil, corn oil, sunflower oil, olive oil, canola oil, sesame oil, peanut oil, cottonseed oil, palm oil, rapeseed oil, tung oil, beef tallow, lard, castor oil, fish oil, or a blend of any of these oils, although epoxidized soybean oil is preferred. Alternatively, any partially hydrogenated vegetable oils or genetically modified vegetable oils can be used to obtain the desired hydroxyl content. Examples of partially hydrogenated vegetable oils or genetically modified vegetable oils include, but are not limited to, high oleic safflower oil, high oleic soybean oil, high oleic peanut oil, high oleic sunflower oil and high erucic rapeseed oil (crambe oil). The iodine values of these vegetable oils range from about 40 to 240. The epoxide content of the epoxidized oil is not critical, but it is preferable that it be in the range of about 4 to 8 percent oxirane.

The fatty acid ester oil is reacted with hydrogen peroxide in an aqueous solvent in the presence of a catalyst to the desired level of epoxidation. The epoxide content of the epoxidized oil is not critical, but it is preferable that it be in the range of about 1 to 10 percent oxirane, preferably in the range of 3 to 8 percent oxirane, and in the case of soy oil a preferred level is from 3-7 percent oxirane. A preferred epoxidation process uses per-acids, including acetic acid, propionic acid and formic acid. Typically the reaction mixture is heated with vigorous stirring.

The epoxidation reaction is stopped and the two phases (oil and aqueous phases) are separated. The aqueous phase containing the acid(s), hydrogen peroxide and water is removed. The oil phase is washed with distilled water at least once to remove the residue of acetic acid, hydrogen peroxide, peracid and sulfuric acid that had been used in the epoxidation step.

The epoxidized oil may be used as is, or may be partially or fully dried under vacuum. The epoxidized oil is hydroxylated prior to the normal finishing steps used in the production of epoxidized oil. The hydroxylation reaction may be done directly following the epoxidation reaction in the same reactor, essentially crating a one pot reaction, saving processing steps.

The epoxidized oil is hydroxylated in the reactor (in-situ) by the addition of one or more alcohols, or an alcohol/water mixture, without adding catalyst. In the present process, it was found that catalysts are not required to open the ring. While not being bound by any particular theory, it is believed that no added catalyst is needed in the in-situ process, as small levels of residual catalyst from the epoxidization process may still be present, and some rings may remain open in-situ to start a reaction. Additionally, a small amount of mono sulfate ester of epoxidized oil made form during the epoxidaiton step which acts as a catalyst in the ring opening step.

Examples of alcohols or alcohol mixtures that may be used in the hydroxylation reaction include, but are not limited to, monoalcohols such a methanol, ethanol, propanol, and butanol. It is desirable to have methanol be part of the alcohol mixture used in the hydroxylation reaction because it is the least expensive alcohol used in the hydroxylation reaction, although its use is not critical. Other alcohol mixtures may also be used so long as the methanol concentration is kept low. In fact, methanol may be used with solvents other than alcohols, such as chloroform, toluene, formic acid, or acetic acid. It is important during the hydroxylation step to always have an excess amount of alcohol present to prevent polymerization and the formation of products having higher molecular weight due to the reaction with the polyol product.

Depending on the grade of polyol (hydroxy number), the desired alcohol such as methanol or ethanol or a mixture of alcohol and water or only water can be added to the reactor containing the washed epoxide oil, then the mixture is heated and refluxed for 6-36 hours. The completion of the reaction (polyol formation) can be monitored by measuring the oxirane value. When the oxirane is less than 0.2%, the vacuum is applied to remove excess water or alcohol. The viscosity and hydroxy values of soy polyol depend on the degree of the epoxidation, type of alcohol and ratio of alcohol to the epoxidized oil. Normally, the viscosity is in the range of 200- to 30000 CPS and hydroxy value between 50 to 250.

The final polyol is then removed from the reactor. No post-treatment of the polyol, such as washing, is required. The polyol obtained from the process of the invention is essentially free of acid catalyst. The polyol will have less than 100 ppm of acid cations, and preferably less than 10 ppm.

The polyols of the invention can be used to make polyurethane resins, which can be used for making resins, foams, adhesives and coatings. The polyols may also be used in other commercial processes, such as, for example, in acid or anhydride curing coatings.

The polyol of the invention, having a low level of cation and anion species performs better in some polyurethane applications. In one application, a polyurethane formed by the polyol of the invention may be used in a slow-release fertilizer coating. The polyurethane coating of the invention showed longer release time than polyurethane coatings formed from polyols made using a sulfuric acid catalyst, and similar to that of castor oil. A faster release time is not desirable for fertilizer application.

The following examples are intended to illustrate further various aspects of the present invention, but are not intended to limit the scope of the invention in any aspect.

EXAMPLES

Experiment 1:

750 grams of soybean oil having an Iodine Value of 132 was placed in a 2 liter, 3-neck, round bottom flask equipped with temperature control, an addition funnel, reflux condenser and stirrer. To this reactor we added 52 grams of glacial acetic acid (AA), 97.5 grams of water and 4.5 grams of sulfuric acid. These ingredients were thoroughly mixed while the reactor system was brought up to a temperature of 70° C. After attaining the temperature set point, 225 grams of a 70 percent solution of hydrogen peroxide was added from the dropping funnel over a period of 3 hours while maintaining the 70° C. temperature and vigorous stirring. After an additional 3.5 hours of reaction time, the contents of the reactor separated into two layers: the aqueous phase which contained AA, sulfuric acids, water and $H_2O_2$ was disposed. Then the oil layer was given a water wash. The crude epoxidized soybean oil has an iodine value of 25 mg k/100 g and an epoxy oxygen content number of 5.4 percent. Now, to this oil, 325 grams methanol, and 62 grams water were added and thoroughly mixed while the mixture was brought to refluxing condition. This mixture was stirred for 4-8 hours. After oxirane dropped to less than 0.2 percent, the excess methanol and water were removed under vacuum. The final recovered soybean oil polyol was a light straw color and had a hydroxyl number range from 180 to 200. Based on the degree of epoxidation, the hydroxy number can be in the range of 60-250 and viscosity at 25° C. can be in the range of 200 15000 cps.

Experimental 2:

750 grams of soybean oil having an iodine value of 132 was placed in a 2 liter, 3-neck, round bottom flask equipped with temperature control, an addition funnel, reflux condenser and stirrer. To this reactor we added 52 grams of glacial acetic acid, 97.5 grams of water and 4.5 grams of sulfuric acid. These ingredients were thoroughly mixed while the reactor system was brought up to a temperature of 70° C. After attaining the temperature set point, 225 grams of a 70 percent solution of hydrogen peroxide was added from the dropping funnel over a period of 3 hours while maintaining the 70° C. temperature and vigorous stirring. After an additional 3.5 hours of reaction time, the contents of the reactor separated into two layers: an aqueous phase containing AA, sulfuric acid, water and $H_2O_2$ was disposed. Then the oil layer was given a water wash. The crude epoxidized soybean oil has an iodine value of 25 mg k/100 g and an epoxy oxygen content number of 5.4 percent. Now, to this oil, 325 grams ethanol, and 62 grams water were added and thoroughly mixed while the mixture was brought to refluxing condition (80° C.). This mixture was stirred for 4-8 hours, after the oxirane dropped to less than 0.2%, the excess of methanol and water were removed under vacuum. The final recovered soybean oil polyol is a light straw color and had a hydroxyl number range from 180 to 200. Based on the degree of epoxidation, the hydroxy number can be in the range of 60-250 and viscosity at 25° C. in the range of 200-15000 cps.

What is claimed is:

1. A method for making an fatty acid ester oil-based polyol consisting of the following steps:
    a) epoxidizing a fatty acid ester oil, in a presence of acid catalyst, consisting of hydrogen peroxide and an acid to form an epoxidized oil
    b) separating said epoxidized oil from the aqueous phase,
    c) washing said separated epoxidized oil with water to remove residual hydrogen peroxide and acid,
    d) optionally drying or partially drying the epoxidized oil under vacuum,
    e) admixing said epoxidized oil with one or more alcohols, water, or a mixture thereof, wherein no acid catalyst is added to the reaction mixture,
    f) heating the alcohol/epoxidized oil to reflux to form by hydroxylation an oil-based polyol, wherein the oxirane content of the polyol is less than 0.2% by weight, and wherein said alcohols are mono-alcohols.

2. The method of claim 1 wherein said fatty acid ester oil comprises one or more vegetable oils.

3. The method of claim 1 wherein said epoxidized fatty acid ester oil is fully or partially dried prior to admixing with said one or more alcohols, water or mixture thereof.

4. The method of claim 1 wherein said method is a one-pot method in which said admixing of said epoxidized fatty acid ester oil and one or more alcohols, water, or a mixture thereof occurs in the same reactor in which the epoxidized fatty acid ester oil had been epoxidized, without removing said epoxidized fatty acid ester oil from said reactor.

5. The method of claim 1 wherein said fatty acid ester oil has an epoxide content of the epoxidized oil of from 1 to 10 percent oxirane.

6. The method of claim 1, further comprising the step of reacting hydrogen peroxide, a fatty acid oil and a per-acid catalyst to form the epoxidized fatty acid ester oil in claim 1.

7. The method of claim 6, wherein said per-acid is acetic acid, propionic acid, formic acid, or a mixture thereof.

8. The method of claim 6, wherein said epoxidized fatty acid ester oil is washed to remove residual hydrogen peroxide, per-acid and sulfuric acid, prior to the addition of the alcohols and/or water in the hydroxylation step.

9. The method of claim 1, wherein said mono-alcohols are selected from the group consisting of methanol, ethanol, propanol, butanol, and mixtures thereof.

* * * * *